US009021661B2

(12) United States Patent
Andel

(10) Patent No.: US 9,021,661 B2
(45) Date of Patent: May 5, 2015

(54) DETECTOR WITH A TELESCOPIC CARRIER/GUIDE ROD

(71) Applicant: Vallon GmbH, Eningen (DE)

(72) Inventor: Benjamin Andel, Tubingen (DE)

(73) Assignee: Vallon GmbH, Eningen (DE)

( * ) Notice: Subject to any disclaimer, the term of this patent is extended or adjusted under 35 U.S.C. 154(b) by 0 days.

(21) Appl. No.: 14/056,548

(22) Filed: Oct. 17, 2013

(65) Prior Publication Data
US 2014/0130306 A1 May 15, 2014

(30) Foreign Application Priority Data

Nov. 12, 2012 (EP) .................................... 12401225

(51) Int. Cl.
*B25G 1/04* (2006.01)
*G01V 3/15* (2006.01)
*F16B 7/14* (2006.01)

(52) U.S. Cl.
CPC ................. *B25G 1/04* (2013.01); *Y10T 16/473* (2015.01); *Y10S 16/25* (2013.01); *Y10T 16/4719* (2015.01); *F16B 7/1418* (2013.01); *G01V 3/15* (2013.01)

(58) Field of Classification Search
CPC ....... B25G 1/04; F16B 7/1454; F16B 7/1445; F16B 7/1418; Y10T 403/7071; Y10T 403/7077; Y10T 16/4719; Y10T 16/473; Y10S 16/25
USPC ....... 16/429, 427, DIG. 25; 403/374.1, 374.5, 403/377, 109.2, 109.5, 109.6
See application file for complete search history.

(56) References Cited

U.S. PATENT DOCUMENTS 2,660,457 A * 11/1953 Mallon .............................. 285/7
4,596,484 A * 6/1986 Nakatani ....................... 403/104
(Continued)

FOREIGN PATENT DOCUMENTS

| DE | 43 18 563 A1 | 12/1994 |
|---|---|---|
| DE | 295 10 304 U | 9/1995 |

(Continued)

OTHER PUBLICATIONS

European Search Report for corresponding European Application No. EP 12 40 1225 dated Mar. 25, 2013.

*Primary Examiner* — Jeffrey O Brien
(74) *Attorney, Agent, or Firm* — Renner, Otto, Boisselle & Sklar, LLP

(57) ABSTRACT

A detector with a telescopic carrier/guide rod at which a measuring probe is disposed at one end, wherein the carrier/guide rod features at least two tubes longitudinally movable inside one another, in which respectively two tubes disposed adjacently in radial direction form an outer tube and an inner tube, whereby the respective outer tube at its overlapping tube end facing the measuring probe features a clamping means for engaging the inner tube. In accordance with this invention, the clamping means is formed as a clamping device that features a profile clamp with a quick-locking device. The profile clamp comprises a holding ring with two half shell-shaped clamping ring segments that are interconnected flexibly on one side and on the opposite side they can be clamped together with a clamping lever. The holding ring features ring breakthroughs and the outer tube the corresponding tube breakthroughs for the accommodation of clamping pieces that are pressed against the inner tube when clamping the clamping ring segments together under pressure. Preferably a clamping ring segment is formed on the holding ring.

13 Claims, 3 Drawing Sheets

(56) References Cited

U.S. PATENT DOCUMENTS

Figure 1:
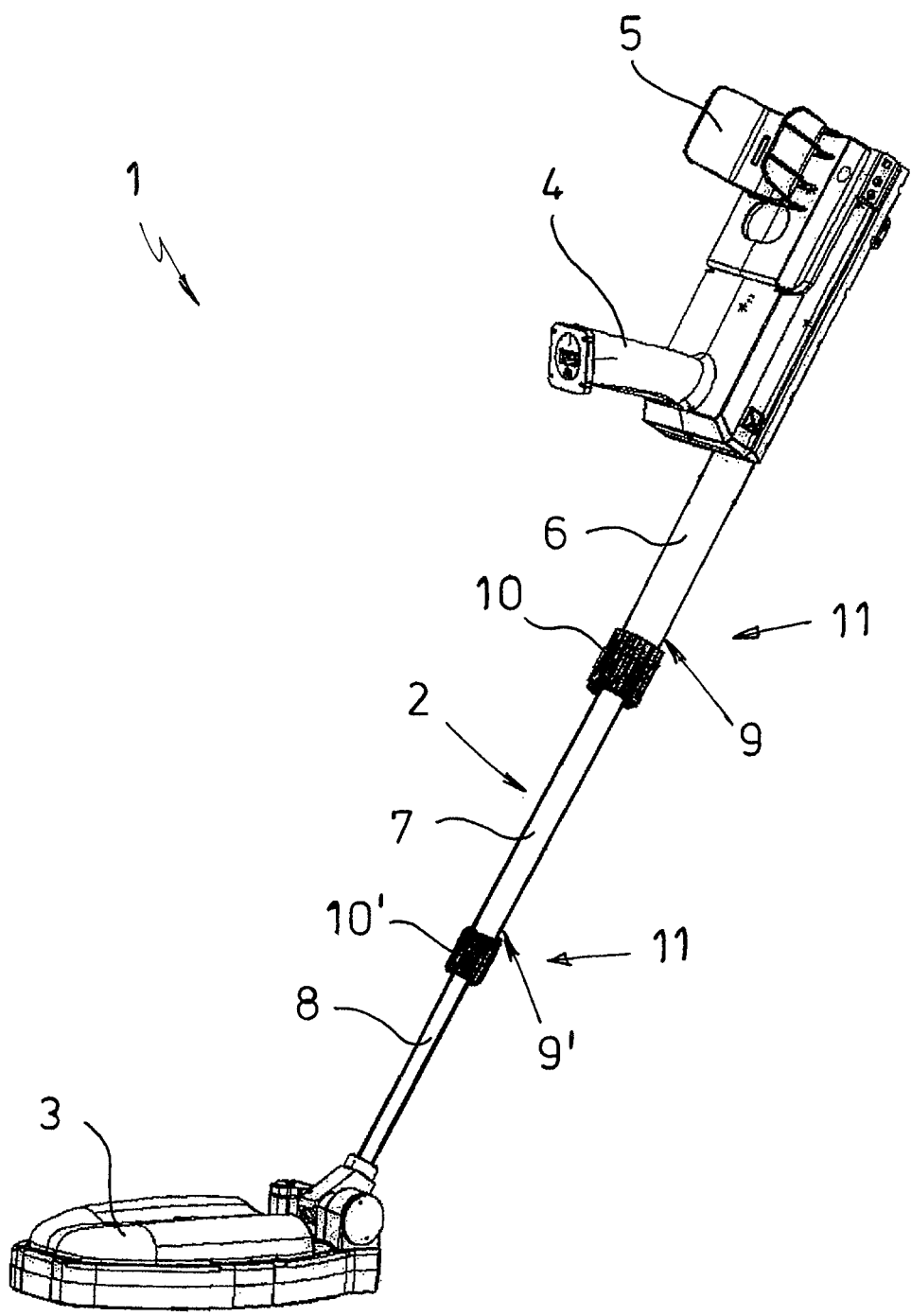

| | | | |
|---|---|---|---|
| 4,639,979 A | 2/1987 | Polson | |
| 5,024,303 A | 6/1991 | Kosloff | |
| 6,142,699 A * | 11/2000 | Pao | 403/109.5 |
| 6,254,305 B1 * | 7/2001 | Taylor | 403/378 |
| 6,305,869 B1 * | 10/2001 | Chen | 403/109.5 |
| 6,461,074 B2 * | 10/2002 | Taylor | 403/378 |
| 6,474,747 B2 * | 11/2002 | Beaulieu et al. | 30/296.1 |
| 6,546,596 B2 * | 4/2003 | Grote et al. | 16/429 |
| 6,948,878 B1 * | 9/2005 | Smith et al. | 403/110 |
| 6,972,042 B2 * | 12/2005 | Benson | 623/38 |
| 7,096,530 B2 * | 8/2006 | Goulet | 15/144.4 |
| 7,144,180 B2 * | 12/2006 | Stahle et al. | 403/109.1 |
| 7,574,806 B2 * | 8/2009 | Wang | 16/429 |
| 7,721,391 B2 * | 5/2010 | Bukovitz et al. | 16/429 |
| 7,774,901 B1 * | 8/2010 | Huang | 16/429 |
| 8,585,095 B2 * | 11/2013 | Cordes et al. | 403/109.2 |
| 8,702,339 B2 * | 4/2014 | Ballentine | 403/322.4 |
| 2006/0284758 A1 | 12/2006 | Stilwell et al. | |
| 2009/0090224 A1 * | 4/2009 | Lin | 81/177.2 |

FOREIGN PATENT DOCUMENTS

| | | |
|---|---|---|
| DE | 298 13 686 U1 | 11/1998 |
| DE | 102 57 515 A1 | 7/2004 |
| FR | 2 886 988 A3 | 12/2006 |
| FR | 2 944 113 A1 | 10/2010 |
| GB | 1 596 268 A | 8/1981 |
| TW | 330 382 U | 4/2008 |
| WO | WO 2005/082221 A1 | 9/2005 |

* cited by examiner

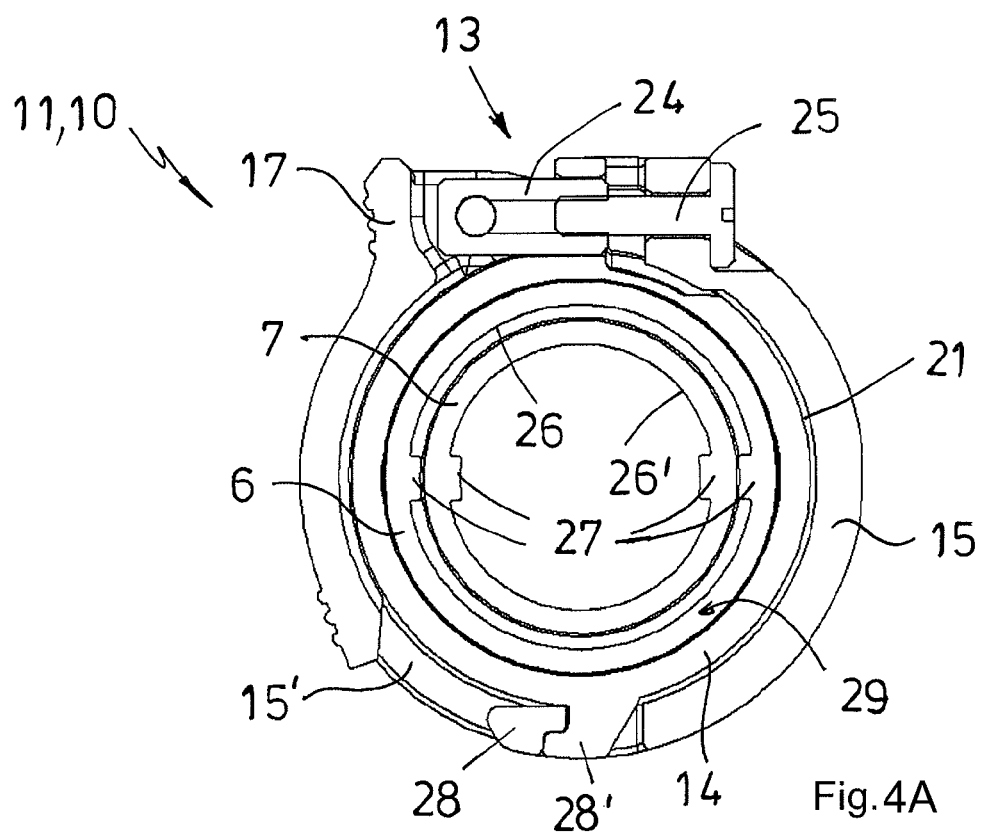
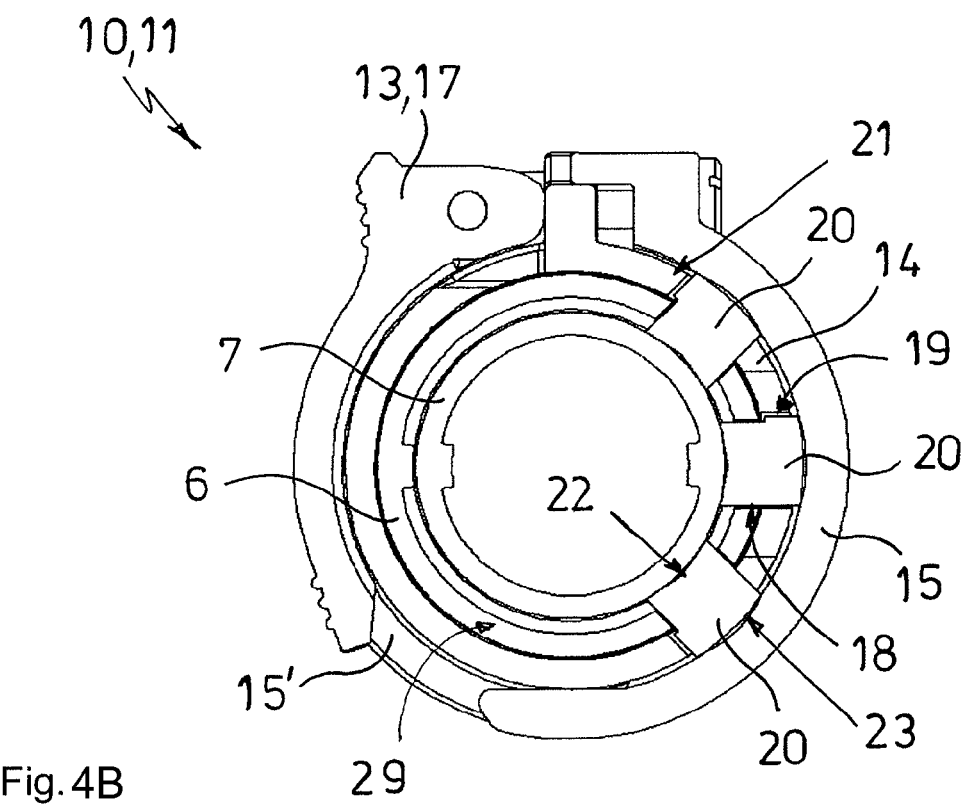

DETECTOR WITH A TELESCOPIC CARRIER/GUIDE ROD

CROSS-REFERENCE TO RELATED APPLICATION

The present application claims priority under 35 USC §119 to European Patent Application No. 12 401 225 3, filed Nov. 12, 2012, the entire disclosure of which is incorporated herein by reference.

TECHNICAL FIELD OF THE INVENTION

The invention relates to a detector with a telescopic carrier/guide rod at which a measuring probe is disposed at one end, whereby the carrier/guide rod features at least two tubes longitudinally displaceable inside one another, of which two tubes respectively form an outer tube and an inner tube adjacently disposed in a radial direction, and whereby the respective outer tube at its overlapping tube end facing the measuring probe features a locking means for engaging the displaceable inner tube, whereby the clamping means is formed as a clamping device comprising a profile clamp with a quick-locking device.

DESCRIPTION OF THE RELATED ART

Detectors are well known in various embodiments for various applications. Exemplary reference is drawn to the hand-held iron and metal detectors that are designed for the detection of metallic objects—such as munitions hidden in the ground, and which apply the magnetic or electromagnetic principle. The telescopic carrier/guide rod allows displacement change between the measuring probe and the handle and thus adapts the detector to different operating conditions and heights of the user—facilitating ergonomic handling. This distance, as a rule, can be altered between a minimum distance for the ease of detector transport in which the longitudinally movable tubes are pushed as far as possible inside one another, and a variably adjustable displacement for application—in that the tubes are pulled apart.

Telescopic carrier/guide rods for detectors exist in a variety of design features. Reference is drawn to the document DE 295 10 304 U1 as an exemplary embodiment. A latching device is disclosed therein as a fixing means comprising a locking pin that engages through holes in pipes adjustably disposed in one another, attached to a U-shaped leaf spring mounted inside the inner tube and the inner tube with the outer tube being adjustably locked in different positions. The outer tube features a number of engaging holes, for the latching bolt, which are disposed at uniform intervals from one another and thus prescribe defined lengths for the application of the carrier/guide rod.

In this state of the art, it is considered disadvantageous that the inner tube cannot be adjusted relative to the outer tube and that the carrier/guide rod is limited to two tubes sliding inside one another due to the leaf spring being disposed inside the inner tube. The minimum distance of the measuring probe and handle, i.e. the minimum length of the carrier/guide rod when the inner tube is completely retracted inside the outer tube is half the maximum length of the carrier/guide rod when it is completely extended. Consequently, in the transport position, it is very difficult for one person to carry the detector on account of the still lengthy sliding tubes.

For the state of the art, reference is further drawn to the exemplary documents DE 298 13 686 U1 and FR 2 944 113 A1.

The DE 298 13 686 U1 discloses a telescopic carrier tube for a metal detector, with at least two telescopic tubes movable in one another and the tubes being lockable by means of a clamp in the desired relative position and with an anti-twist lock for the tubes, so that it is no longer possible for the tubes to be twisted. Locking of the preferably angularly formed tubes can take place by means of a clamping lever attached to the external tube so that the inner tube is held on a surface by means of pressure. Another disclosed possibility exists therein—to taper the end of the external tube with a tension band so that the inner tube is held on the overall circumference and a uniform clamping effect is attained.

The FR 2 994 113 A1 teaches about a stepped carrier tube for a metal detector. It features an upper unchangeable and a lower telescopic tube element that are interconnected over an S-shaped middle part. The lower tube element comprises a main tube part connected with the middle part, a slide tube piece that can be slid inside the main tube part as well as a locking unit for clamping the sliding tube piece on the main tube unit. Alternatively, the lower tube element can also be formed as one piece, guided movably on the middle part and a lock unit clamped immovably on the middle part. In both cases, the locking unit is formed as a profile clip with a quick-locking device.

Starting from the above-mentioned state of the art, an object of the invention is to propose a detector with a telescopic carrier/guide rod, in which the carrier/guide rod, in the retracted state for the transport of the detector, is as short as possible, i.e. may be just a little longer than the length of one of the tubes. With it, the fixing means shall be simple in design, handy and also permanently operationally safe.

SUMMARY OF THE INVENTION

This object is met according to the invention by a detector with the features described herein.

Thus, in the detector according to this invention with a telescopic carrier/guide rod, the clamping means is formed as a clamping device that features a profile clamp with a quick-locking device for fixing at least one inner tube on at least one outer tube. The profile clamp is disposed outside on the outer tube and clamps the inner tube. It does not engage in particular into the inner tube so that the inner tube can receive a further tube as an additional longitudinally movable inner tube for which this again forms an outer tube. Naturally, this inner-/outer tube then also features a clamping device for the additional inner tube, which enables clamping of this inner tube in a corresponding manner. The invention, however, is not limited to three tubes longitudinally movable inside one another. Each convenient number of tubes can be used.

In accordance with this invention, the profile clamp is immovably disposed on the overlapping tube end of the outer tube or an inner tube forming an outer tube, i.e. it is at least fixed in longitudinal direction of the tube bearing the profile clamp. An additional rotary fixation is also appropriate, however, also a limited rotation of the profile clamp in circumferential direction is allowable. The used profile clamp features in particular a holding ring with two half shell-shaped clamping ring segments. These are interconnected flexibly on one of its face sides and on the other face sides they can be clamped together by means of a clamping lever. The quick-locking device is adjustable, i.e. the clamping force is variable and can be adjusted individually by means of a screw. The clamping lever is appropriately adapted to the form of the holding ring and/or the clamping ring segments and hardly projects laterally when the inner tube is clamped by the carrier/guide rod tubes. It is therefore not troublesome when using the detector and it also cannot be actuated accidentally. The clamping device is reliable and self-locking.

The profile clamp provided according to this invention enables an optimum and easy displacement of the at least one inner tube relative to the assigned overlapping outer tube in any position, i.e. in any relative position of the inner tube vis-à-vis the outer tube. With it, through the high stability of the profile clamp in conjunction with the quick-locking device that features a clamping lever with a big mechanical advantage, a large clamping force is attained. At low material cost and less design scope as well as fabrication expenses, the tubes of the telescopic carrier/guide rod are easily pulled apart, pushed together and fixable on one another. The possibility of adjusting these tubes is infinite. Thus, the telescopic tubes can have an arbitrary open or closed cross-section form, for example, circular, oval or polygonal. Preferred in circumferential direction are closed circular tubes that are guided smoothly sliding inside one another.

With a preferred embodiment of the invention, the overlapping tube end of the outer tube, and/or an inner tube also forming an outer tube features one or several tube breakthroughs—closed up in themselves—disposed next to one another, through which the profile clamp clamps the respective inner tube on its outer side. Clamping of at least one inner tube of the carrier/guide rod takes place over a corresponding number of clamping protrusions that are formed internally on the holding ring or over one or several clamping pieces that are not connected with the holding ring and that are included loosely in the tube breakthroughs, overlapped by the holding ring. The tube breakthroughs can feature any contour and be disposed next to one another in the circumferential and/or longitudinal direction/s of the respective outer tube. The clamping protrusions and/or the clamping pieces are preferably adapted in their form to the contour of the tube breakthroughs, and engage radially movably into the tube breakthroughs. For a uniform clamping force, it is advantageous to provide several tube breakthroughs on the sliding tube end and to dispose these distributed contiguously in circumferential direction over the outer tube, preferably with equal distance to one another around the tube end.

In an advantageous embodiment of the detector according to this invention, the clamping device features at least a clamping piece that is disposed movably in at least one tube breakthrough in radial direction of the outer tube. That at least a clamping piece projects over the outer circumference of the inner tube and at least touches one of the clamping ring segments on the inner circumference. When tensioning the clamping ring segments, all available clamping pieces are subjected to a clamping force that acts on the inner tube that is to be clamped. The clamping ring segments can be optionally provided with an inner depression for at least one clamping piece, so that the profile clamp is held on the tube end by at least one clamping piece and firmly held in position. The depression is appropriately adapted to the cross-section form of such a clamping piece. However, it can deviate there from and/or be formed as an overlapping inner ring groove. Moreover, it is advantageous to form the respective clamping piece, i.e. deformable plastically or elastically in order to attain a possibly large clamping force. However, elastically deformable clamping pieces are not excluded as long as they feature conveniently sufficient shore hardness.

Preferably, in an embodiment according to the invention, a holding ring is disposed between the clamping ring segments and the overlapping tube end, which is pushed on said tube end immovably. The holding ring is fixed on the tube end at least in the axial direction of the outer tube, however, ideally also in the circumferential direction. The holding ring is formed cylindrically hollow and bears the clamping ring segments immovably. In addition, any convenient holding means can be provided on the holding ring and/or clamping ring segments. For example, the holding ring and clamping ring segments can at least partially overlap one another on the face side.

Advantageously, the holding ring features at least a ring breakthrough, which is closed in itself and at least one is assigned to the tube breakthrough on the sliding tube end. Ideally, an equal number of tube breakthroughs and ring breakthroughs are provided. Every ring breakthrough is superimposed by a tube breakthrough and extends in particular without hindrance into the latter.

In a particularly efficient embodiment of the carrier/guide rod of the detector according to the invention, at least one clamping piece of the clamping device penetrates the tube breakthrough and the ring breakthrough together, therefore protruding over the outer circumference of the holding ring. It braces itself internally at least on one of the clamping ring segments. Therewith the profile clamp with the quick-locking device can press the one or several clamping piece/s against the inner tube and therewith clamp immovably on the outer tube. In particular, the holding ring is held there by means of at least one clamping piece in an axial and also circumferential direction on the sliding tube end of the outer tube.

Furthermore, the holding ring can feature a position limit stop assigned inside the face side of the sliding tube end of an outer tube or also of an inner tube forming an outer tube. The position limit stop simplifies the assembly of the carrier/guide rod on the one hand during the manufacture and moreover functions on the outer tube as a fixed limit stop for the clamping device, in particular as the holding ring of an inner tube forming an outer tube. Preferably, the position limit stop is formed as a face-side ring collar or ring collar section, whereby the holding ring with the large part of its length overlaps the respective tube end of the outer tube in an axial direction. Therewith, the inner tubes can be pushed into the outer tube as far as possible.

Furthermore, at least one or both tension ring segments can always feature one of the face sides of the overlapping tube end and/or alignment limit stop assigned to the holding ring, which is made as a face-side ring collar section. This does position the clamping ring segments during tensioning with one another vis-à-vis the exact holding ring position. Moreover, the alignment limit stop also functions as a fixed limit stop for the clamping device of the inner tube when this, as an outer tube, receives a further inner tube.

In a particularly advantageous embodiment according to the invention, one of the two clamping ring segments is formed on the holding ring and the other clamping ring segment is connected with the holding ring in a flexible manner, preferably connected with the formed clamping ring segment. This essentially simplifies the design of the profile clip with the quick-locking device and also the clamping together of the ring segments. With it, the clamping lever is pivotally mounted on the required clamping ring segment. The clamping lever preferably features a bend corresponding to the clamping ring segments. Advantageously, the formed and therewith immovable clamping ring segment is provided with an outer mounting depression for the clamping lever, so that the clamping lever with the clamping ring segment are clamped together, i.e. a clamped inner tube in radial direction no longer or only negligibly projects over the holding ring.

The invention is explained in detail below based on an exemplary embodiment depicted in the drawing. Further features of the invention result from the following description of the exemplary embodiment of the invention in connection with the claims and the attached drawing. The individual features of the invention can be implemented as a single entity or combined to implement different embodiments of the invention. Shown are:

FIG. 1 A detector according to this invention with telescopic carrier/guide rod in perspective view.

Figure 2:
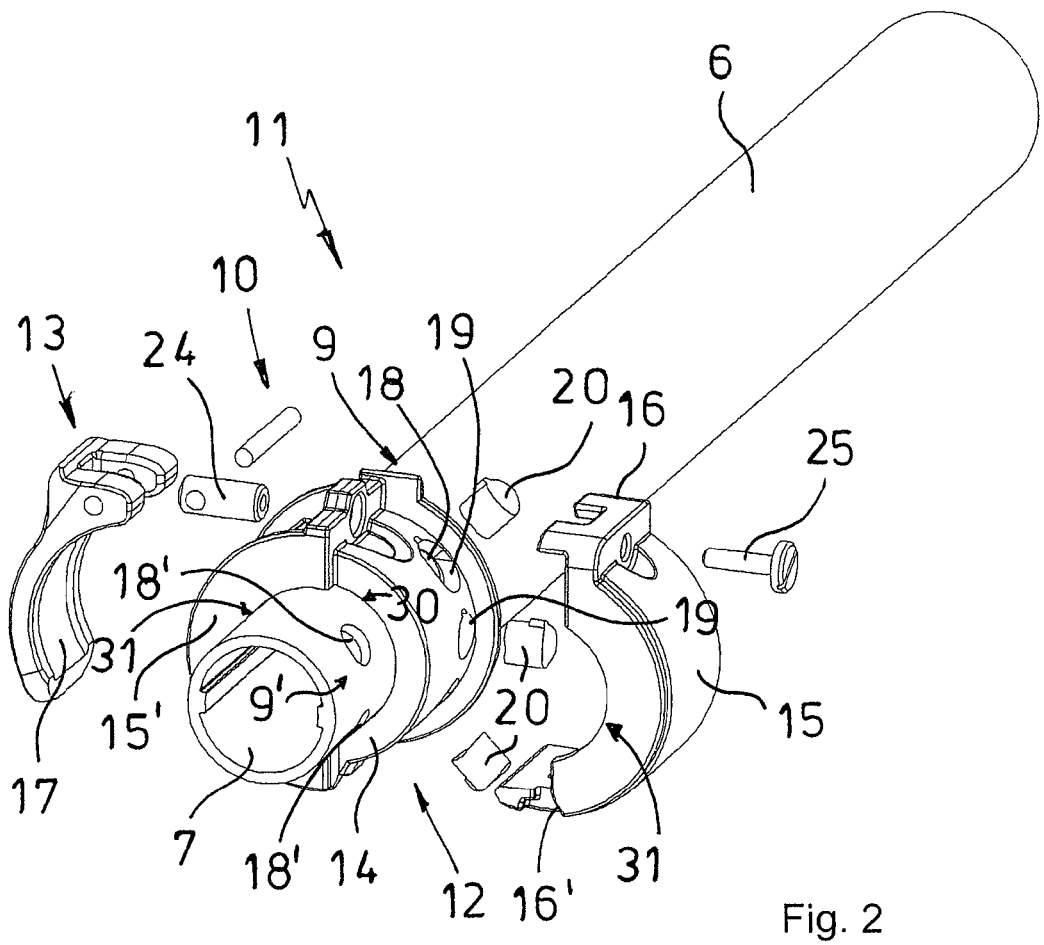

FIG. 2 A perspective sectional magnification of the carrier/guide rod from FIG. 1 in the clamping area of an inner tube on an outer tube.

Figure 3:
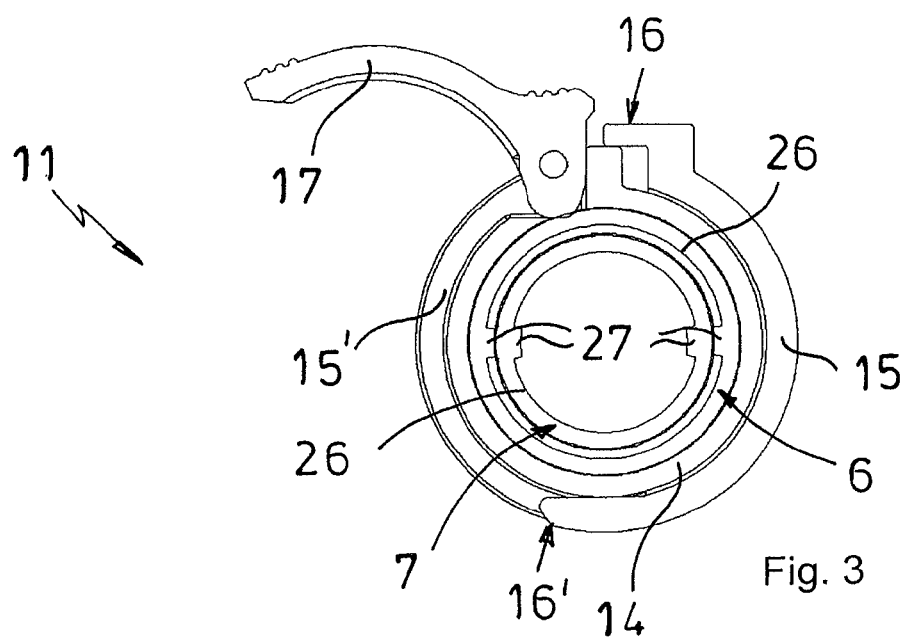

FIG. 3 The clamping area from FIG. 2 in a face-side view with sectioned inner tube and outer tube, in the non-clamped state of the inner tube.

FIG. 4A The clamping area from FIG. 2 in sectioned representation in the clamped state with the sectioned plane next to the clamping pieces.

FIG. 4B The clamping area from FIG. 2 in sectioned representation in the clamped state with the sectioned plane through the clamping pieces.

FIG. 1 features a detector 1 according to the invention, with a telescopic carrier/guide rod 2 at which a measuring probe 3 is disposed and on its other end a handle 4 is disposed near a forearm support 5. The carrier/guide rod features three tubes 6, 7, 8 guided in one another longitudinally movably, whereby the tube 6 is a pure outer tube and the tube 8 is a pure inner tube and whereby the tube 7 forms an inner tube 7 for the outer tube 6 and an outer tube 7 for the inner tube 8. On the sliding side tube ends 9, 9' of the tubes 6 and/or 7 a clamping device 10, 10' is disposed respectively, with which the inner tube 8 can be fixed on the tube 7 and the tube 7 on the outer tube 6 in an any relative position. The clamping devices 10, 10' on the clamping areas 11, 11', which are represented in FIG. 1 only schematically, are depicted identically, apart from the size, with the same mechanism. They are adapted in diameter to the cross-section of the tubes 6, 7. FIG. 2 shows in detail the clamping device 10, with which the inner tube 7 can be fixed on the outer tube 6.

FIG. 2 features a sectional enlargement of the carrier/guide rod from FIG. 1 in the clamping area 11. The clamping device 10 is formed as a profile clamp 12 with a quick-locking device 13. It is disposed immovably on the sliding tube end 9 of the outer tube 6. The profile clamp 12 features a holding ring 14 with two half shell-shaped clamping ring segments 15, 15' that are interconnected flexibly on a face side 16 and on the other face side 16' can be clamped together by means of a clamping lever 17. The first clamping ring segment 15 is movable vis-à-vis the second clamping ring segment 15' and the holding ring 14 in radial direction, whereby the second clamping ring segment 15' is formed on the holding ring 14 in the represented exemplary embodiment. The invention, however, is not limited to this embodiment. Alternatively, the holding ring 14 can also bear both clamping ring segments 15, 15' movably.

In FIG. 2, the inner tube 7 is pushed completely inside the outer tube 6. It is represented without the clamping device 10' on the sliding tube end 9'. On the tube end 9' of the inner/outer tube 7, with which the tube 7 can be pushed on the inner tube 8—not represented in the drawing—several tube breakthroughs 18'—closed in themselves—are disposed next to one another and are disposed in a circumferential direction, which are also available as tube breakthroughs 18 on the sliding tube end 9 of the outer tube 6 in a similar form. Thereby the tube breakthroughs 18 are partially invisible because they are covered in some places by the holding ring 14. The holding ring 14 features the tube breakthroughs 18 of the ring breakthroughs 19 assigned to the outer tube 6, which are disposed overlaying the tube breakthroughs 18. The ring breakthroughs 19 and the tube breakthroughs 18 transform into one another without hindrance. They are provided for the accommodation of a corresponding number of clamping pieces 20 of the clamping device 10 that respectively, radially penetrate the assigned ring breakthrough 19 and the corresponding tube breakthrough 18 together. As FIG. 4b shows, the clamping pieces 20 protrude over the outer circumference 21 of the holding ring 14 and brace themselves internally on the movable clamping ring segment 15. They are adapted in form to the outer contour of the ring breakthroughs 19 and/or the tube breakthroughs 18. The clamping pieces 20 are formed particularly stable and can be pressed by means of the movable clamping ring segment 15 when clamping both clamping ring segments 15, 15' together with pressure against the inner tubes 7.

Through the collective engagement into the ring breakthroughs 19 of the holding ring 14 and into the tube breakthroughs 18 of the outer tube 6, the clamping pieces 20 cause the holding ring 14 with the formed clamping ring segment 15' to be pushed immovably on the overlapping tube end 9 in axial and circumferential directions of the outer tube 6. The holding ring 14 with the formed clamping ring segment 15' bears the movable clamping ring segment 15 immovably. As can be derived from FIG. 4b, the clamping pieces 20 stand with a front face surface 22 on the inner tube 7 and brace themselves with a rear face surface 23 on the movable clamping ring segment 15. When clamping the movable clamping ring segment 15 with the immovable clamping ring segment 15' by means of the clamping lever 17, the clamping pieces 20 as depicted in FIG. 4b are pressed against the inner tubes 7, so that the inner tube 7 is fixed vis-à-vis the outer tube 6. For setting the pressing force, a threaded sleeve 24 is provided with adjusting screw 25 that connects the pivoted clamping lever 17 with the movable clamping ring segment 15.

FIG. 3 features the clamping area 11 from FIG. 2 in a face-side view on the outer tube 6 as well as on the holding ring 14 of the carrier/guide rod 2 in the non-clamped state of the inner tube 7 on the outer tube 6. The outer tube 6 on its inner circumference 26 features two strip-shaped guiding elements 27 extending in longitudinal direction, which prevent the inner tube 7 and the outer tube 6 from touching one another completely. This eases an axial displacement of the tubes 6, 7 relative to one another when the clamping device 10 is not effective. The clamping lever 17 protrudes laterally from the holding ring 14 if the inner tube 7 is not clamped. In this position, the movable clamping ring segment 15 is not clamped with the clamping ring segments 15' formed on the holding ring 14, so that the clamping pieces 20 invisible in FIG. 3 do not hold the inner tube 7 detachably clamped on the outer tube 6. The face sides 16', of the clamping ring segments 15, 15', distant from the clamping lever 17 are hooked in one another, the other face sides 16 of the clamping ring segments 15, 15' disposed near the clamping lever 17, are displaced from one another.

In FIG. 4a, the clamping area 11 in the clamped state of both tubes 6, 7 is depicted in a sectioned manner. The represented section extends in the plane of the thread sleeve 24 provided for setting the clamping force with the adjusting screw 25. The connection hooks 28, 28' of both clamping ring segments 15, 15' are clearly visible, over which the movable clamping ring segment 15 is connected pivotally with the immovable clamping ring segment 15'. In the clamped state of both clamping ring segments 15, 15' the clamping lever 17 lies laterally on the holding ring segment 15' of the holding ring 14. Moreover, it is visible that the inner tube 7 that is simultaneously an outer tube 7—not represented—for the inner tube 8 also features guiding elements 27 internally, which act in conjunction with the guiding elements 27 of the outer tube 6.

FIG. 4b once again features the clamping area 11 in the clamped state of outer tube 6 and inner tube 7 in a sectioned representation, whereby this time the sectioned plane passes through the clamping pieces 20. Now the tube breakthroughs 18 and the ring breakthroughs 19 are clearly visible, in which the clamping pieces 20 are mounted. The clamping pieces 20 are in contact with the front face side 22 on the inner tube 7 and brace themselves with their rear face side 23 under pressure on the movable clamping ring segment 15. The front face side 22 of the clamping pieces 20 is not formed plane, but rather features two partial areas, which extend angularly to one another and adjoin tangentially on the inner tube 7.

As FIG. 2 shows, the holding ring 14 internally features a position limit stop 30 that is formed as a face-side ring collar section, assigned on the face side 29 of the sliding tube end 9 of the outer tube 6. The position limit stop 30 features only a short length so that the holding ring 14 with the large part of its length overlaps the sliding tube end 9 in an axial direction. The clamping ring segments 15, 15' feature a corresponding alignment limit stop 31.

The invention claimed is:

1. A detector with a telescopic carrier/guide rod, comprising:
    a measuring probe disposed at one end of the carrier/guide rod; and
    at least two rod tubes being arranged longitudinally movable one within another, wherein two of said at least two rod tubes are arranged in a radial direction neighbored to each other and forming an outer rod tube and an inner rod tube,
    wherein the outer rod tube includes, at an overlapping tube end facing the measuring probe, a locking means for movably engaging the inner rod tube,
    wherein the locking means is formed as a clamping device that includes a profile clamp with a quick-action tension lock,
    wherein the profile clamp is immovably arranged at the overlapping rod tube end of the outer rod tube and includes a holding ring with half shell-shaped first and second clamping ring segments that are flexibly connected together at one circumferential front side of each segment and are capable of being clamped together at the other circumferential front side of each segment by means of a clamping lever, wherein the holding ring is formed cylindrically hollow and bears the clamping ring segments and wherein the holding ring is pushed on an outer surface of the respective overlapping tube end of the respective outer tube immovably, and
    wherein at least one of the clamping ring segments is movable with respect to the other clamping ring segment and the holding ring in the radial direction of the rod tubes.

2. The detector according to claim 1 wherein the overlapping tube end of the outer tube features at least one tube breakthrough.

3. The detector according to claim 2 wherein the clamping device features at least a clamping protrusion or a clamping piece, which is disposed radially movably in the at least one tube breakthrough and protrudes on the respective outer tube and stands adjacent inside the first clamping ring segment.

4. The detector according to claim 3 wherein the clamping protrusion or clamping piece is rigid and the first clamping ring segment presses the clamping protrusion or clamping piece when bracing the two clamping ring segments with each other under employing force against the inner tube.

5. The detector according to claim 3, wherein the holding ring features at least a ring breakthrough, which overlays at least one tube breakthrough.

6. The detector according to claim 5 wherein the clamping protrusion or clamping piece of the clamping device penetrates the tube breakthrough and the ring breakthrough together and protrudes over an outer circumference of the holding ring and braces itself inside one of the clamping ring segments.

7. The detector according to claim 6 wherein the holding ring is held by means of the clamping protrusion or clamping piece on the overlapping tube end of the outer tube.

8. The detector according to claim 1, wherein the holding ring is inside a position limit stop arranged at a face side of the overlapping tube end.

9. The detector according to claim 8, wherein the position limit stop is formed as a face-side ring collar or ring collar section, whereby the holding ring overlaps the overlapping tube end in an axial direction with a large part of length of the holding ring.

10. The detector according to claim 1, wherein at least one of the clamping ring segments is inside an alignment limit stop assigned on a face side of the overlapping tube end, which is formed as a face-side ring collar section.

11. The detector according to claim 1, wherein the first clamping ring segment is formed on the holding ring and the second clamping ring segment is connected flexibly with the holding ring.

12. The detector according to claim 1, wherein the clamping lever features a bend corresponding to the clamping ring segments.

13. The detector according to claim 11, wherein the first clamping ring segment is connected flexibly with the holding ring.

* * * * *